(12) United States Patent
Titus et al.

(10) Patent No.: US 10,215,120 B2
(45) Date of Patent: Feb. 26, 2019

(54) METHODS AND SYSTEM FOR OPERATING A VEHICLE WITH A VENTED HOOD AND RAIN TRAY

(71) Applicant: Ford Global Technologies, LLC, Dearborn, MI (US)

(72) Inventors: Matthew Arthur Titus, Livonia, MI (US); Jeff Grauer, Northville, MI (US); Jon Holt, Howell, MI (US); Thomas Joseph Ciccone, Madison Heights, MI (US); Mike Makled, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 15/441,034

(22) Filed: Feb. 23, 2017

(65) Prior Publication Data
US 2018/0238254 A1 Aug. 23, 2018

(51) Int. Cl.
*F02D 41/12* (2006.01)
*B60Q 9/00* (2006.01)
*G01S 19/14* (2010.01)
*B62D 25/24* (2006.01)
*B62D 25/12* (2006.01)
*F02D 41/02* (2006.01)

(52) U.S. Cl.
CPC ............. *F02D 41/12* (2013.01); *B60Q 9/00* (2013.01); *B62D 25/12* (2013.01); *B62D 25/24* (2013.01); *F02D 41/021* (2013.01); *G01S 19/14* (2013.01); *F02D 2200/50* (2013.01); *F02D 2200/70* (2013.01)

(58) Field of Classification Search
CPC .. F02D 41/12; F02D 2200/70; F02D 2200/50; G01S 19/14; B60Q 9/00; B62D 25/24; B62D 25/12
See application file for complete search history.

(56) References Cited

U.S. PATENT DOCUMENTS

| 4,850,444 | A | * | 7/1989 | Bojanowski | ........... B60K 11/08 180/68.1 |
| 5,653,493 | A | * | 8/1997 | Spears | ................. B62D 35/001 296/180.2 |
| 5,950,753 | A |  | 9/1999 | Muldoon et al. | |
| 7,559,391 | B2 | * | 7/2009 | Bradley | ............... B60K 11/085 180/68.1 |
| 8,936,128 | B2 | * | 1/2015 | Numa | ................... F01N 3/2066 180/69.25 |

(Continued)

FOREIGN PATENT DOCUMENTS

EP 2607130 A1 6/2013

*Primary Examiner* — Hussein Elchanti
*Assistant Examiner* — Majdi Alsomiri
(74) *Attorney, Agent, or Firm* — Julia Voutyras; McCoy Russell LLP (57) ABSTRACT

Methods and systems are provided for controlling a speed of a vehicle based on whether a rain tray is coupled within the vehicle, below a vented hood of the vehicle. In one example, a method may include maintaining a vehicle speed of a vehicle below a set vehicle speed threshold and alerting a vehicle operator of the set vehicle speed threshold when it is detected that a rain tray is installed in the vehicle, below a vent of a vented hood of the vehicle. In another example, the set vehicle speed threshold may be reduced due to the presence of rain.

18 Claims, 4 Drawing Sheets

(56) References Cited

U.S. PATENT DOCUMENTS

| | | | |
|---|---|---|---|
| 2003/0075950 A1* | 4/2003 | Rees | B62D 35/007 |
| | | | 296/180.1 |
| 2006/0201727 A1* | 9/2006 | Chan | B62D 25/105 |
| | | | 180/69.25 |
| 2013/0005232 A1 | 1/2013 | Hoke et al. | |

* cited by examiner

METHODS AND SYSTEM FOR OPERATING A VEHICLE WITH A VENTED HOOD AND RAIN TRAY

FIELD

The present description relates generally to methods and systems for controlling a vehicle based on whether a rain tray is coupled within the vehicle, below a vented hood of the vehicle.

BACKGROUND/SUMMARY

Vehicles include a hood positioned at the front end of the vehicle to protect an engine of the vehicle and additional under hood components from external elements, such as rain. In some vehicles, the hood may include one or more vents (e.g., in the form of louvers) positioned on a top surface of the hood. These vents create a vented hood that allows airflow to enter and exit from underneath the hood. In one example, venting airflow from underneath the hood reduces an amount of lift on the vehicle, thereby increasing vehicle control (e.g., stability). Additionally, vented hoods allow increased airflow to the engine components (e.g., such as heat exchangers), thereby increasing cooling of the engine. However, the vents of the vented hood may also allow external elements, such as rain, to enter the vehicle, underneath the hood. This may result in degradation of engine components and electronics. In order to reduce engine degradation from rain entering via the vented hood, a rain tray (or rain guard) may be coupled to an underside of the vented hood, beneath one or more of the hood vents.

However, the inventors herein have recognized potential issues with such systems. As one example, when the rain tray is installed with the vented hood, the rain tray blocks at least a portion of the hood openings created by the vents, thereby reducing airflow to the engine. As a result, reduced engine cooling may be provided when the rain tray is coupled to the vented hood. Additionally, at higher vehicle speeds, an increased load (e.g., from entering airflow) may be applied to the rain tray and result in rain tray degradation. Further, if the rain tray is not mounted to the vents of the vented hood while the vehicle is operating (e.g., due to the vehicle operator removing it) and it begins to rain, engine degradation may occur.

In one example, the issues described above may be addressed by a method for, in response to a signal indicating that a rain tray is coupled within a vehicle, below a vent of a vented hood of the vehicle, maintaining a vehicle speed of the vehicle below a set vehicle speed threshold and alerting a vehicle operator of the set vehicle speed threshold. In this way, the engine may receive adequate cooling airflow while the rain tray is installed, while also reducing degradation of the engine due to rain and degradation of the rain tray due to increased vehicle speed and airflow.

As one example, in response to detecting that a rain tray is coupled within an under hood area of the vehicle, below a vent of a vented hood of the vehicle, a speed of the vehicle may be maintained below a set vehicle speed threshold. Additionally, a vehicle operator may be notified of the set vehicle speed threshold and/or that the vehicle speed is being maintained below the set vehicle speed threshold due to the rain tray being coupled with the vented hood. In one example, the set vehicle speed threshold may be a first vehicle speed threshold. In response to rain being detected at the vehicle, the set vehicle speed threshold may be decreased further to a second vehicle speed threshold which is lower than the first vehicle speed threshold. If the rain tray is not coupled with and/or below the vented hood (e.g., the vehicle operator removes the rain tray), the vehicle speed may not be limited based on the rain tray and/or rain and instead, the vehicle speed may be adjusted to an operator-demanded level. However, if rain is detected while the rain tray is not installed in the vehicle, the vehicle operator may be notified to install the rain tray underneath the vented hood in order to reduce degradation of engine components. In this way, engine degradation due to rain may be reduced while allowing a vehicle operator the option of driving with or without the rain tray. Additionally, by limiting vehicle speed while the rain tray is installed, a sufficient amount of cooling airflow may be delivered to the engine while also reducing degradation to the rain tray.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
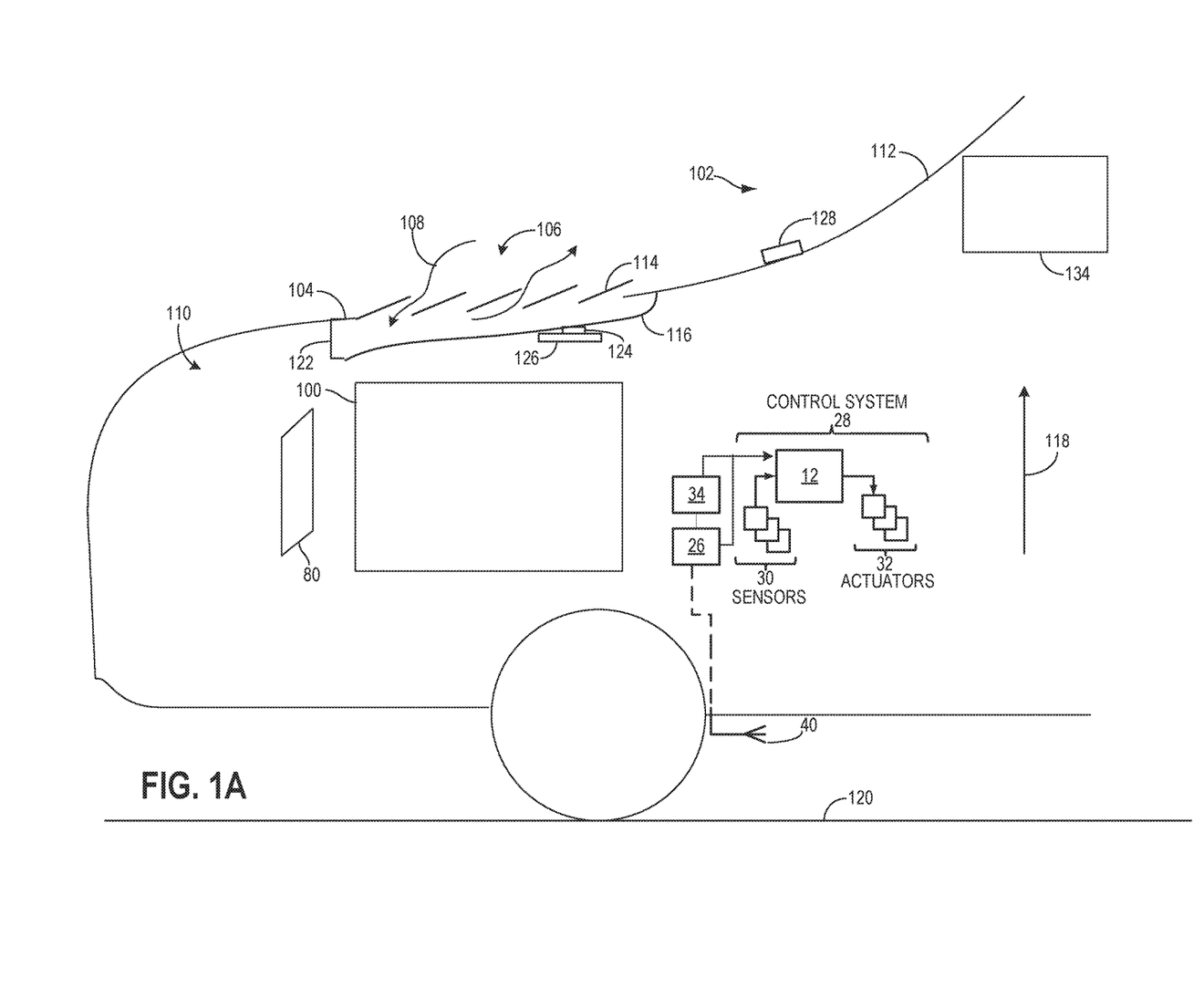
FIG. 1A shows a schematic diagram of a vehicle including a vented hood and a rain tray coupled below the vented hood.
Figure 1B:
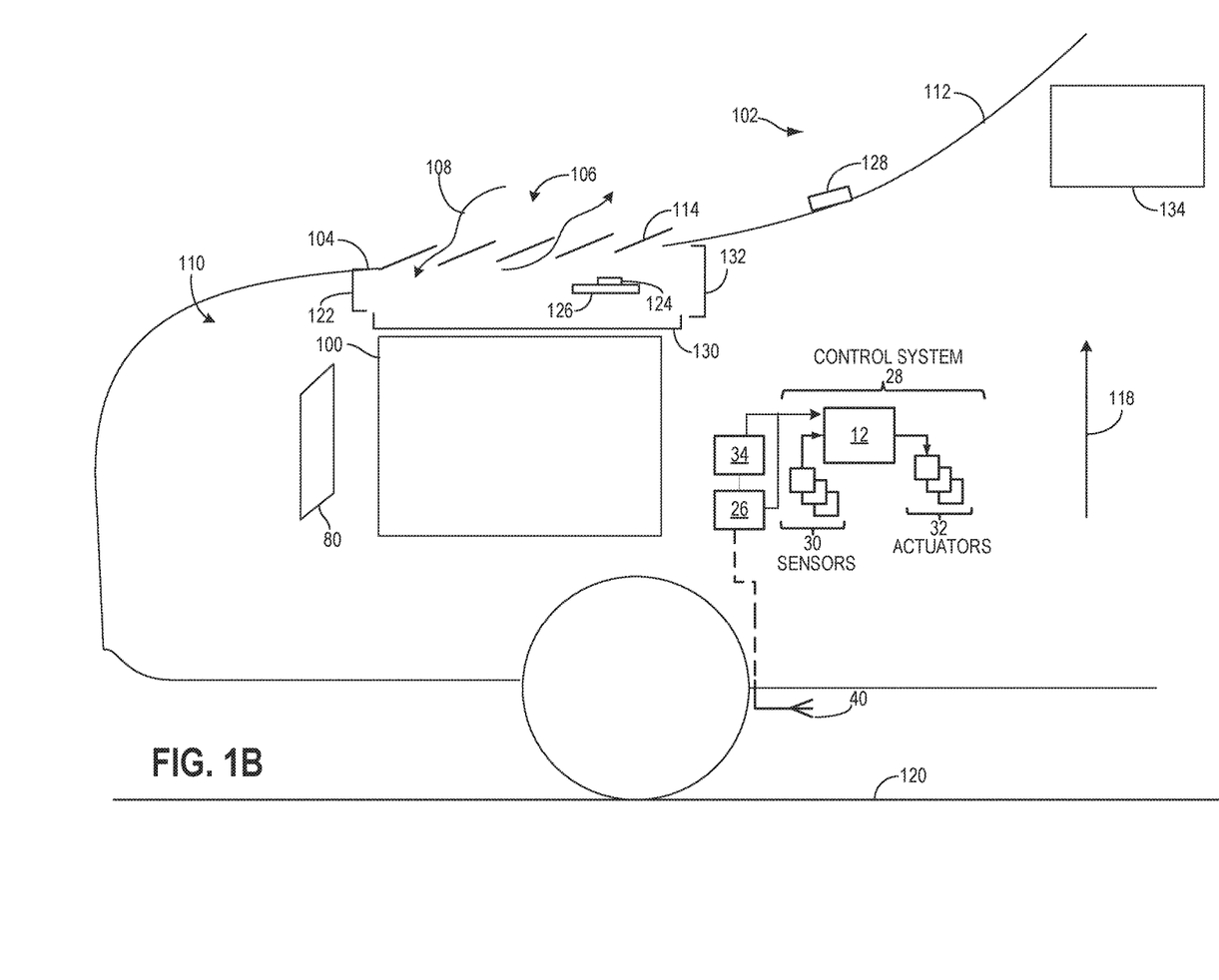
FIG. 1B shows a schematic diagram of the vehicle including the vented hood with a rain tray removed from below the vented hood.

The following description relates to systems and methods for controlling a speed of a vehicle based on whether a rain tray is coupled within the vehicle, below a vented hood of the vehicle. A rain tray may be mounted within an under hood area of the vehicle, below vents of a vented hood, as shown in FIG. 1A. The rain tray may catch and divert rain entering the vehicle via the vented hood away from the engine, thereby reducing engine degradation. However, the rain tray may also block a portion of the airflow entering the vents of the vented hood from reaching the engine. As a result, engine cooling may be decreased when the rain tray is mounted within the vehicle. The rain tray may be manually removable by a vehicle operator, as shown in FIG. 1B. Removing the rain tray may increase the area for airflow entering the vented hood and reaching the engine, thereby increasing cooling airflow to the engine. A speed of the vehicle may be adjusted, or maintained below a threshold level, based on whether the rain tray is coupled with or uncoupled from the vehicle, as shown in the example method presented at FIG. 2. For example, if the rain tray is present within the vehicle, positioned below the vents of the vented hood, the vehicle speed may be maintained below a first threshold level, even if the vehicle speed demanded by the vehicle operator is greater than the first threshold level. However, if the rain tray is not present within the vehicle, the vehicle speed may be adjusted to the operator demanded level and not limited based on the rain tray. Additionally, if rain is detected while the rain tray is not mounted below the vents of the vented hood, an alert may be generated and delivered to the vehicle operator indicating that the rain tray should be reinstalled. Example adjustments to vehicle speed based on the presence of the rain tray within the vehicle and the detection of rain at the vehicle are shown at FIG. 3. In this way, a desired level of engine cooling may be provided while the rain tray is installed, while also reducing degradation to the engine (from rain) and rain tray (from increased airflow via the vents of the vented hood).

FIGS. 1A-1B show a schematic diagram of a vehicle 102 including a vented hood 104 positioned at a front-end of the vehicle 102. FIG. 1A shows the vehicle 102 with a removable rain tray 116 coupled below the vented hood 104. FIG. 1B shows the vehicle 102 with the rain tray 116 removed and not coupled below the vented hood 104. As shown in FIGS. 1A-1B, the vented hood 104 includes a plurality of vents (e.g., hood vents) 106 arranged along a top surface of the vented hood 104. As shown in FIG. 1A-1B, the plurality of vents 106 are consecutively arranged along a portion of the vented hood 104, between a nose (e.g., front) and windshield 112 of the vehicle 102. Each vent 106 may be in the form of a louver 114 which is angled relative to the top, outer surface of the vented hood 104 and spaced away from adjacent louvers to create vent holes or spaces for airflow to enter and exit an under hood area 110. The vents 106 allow airflow (e.g., ambient airflow) 108 into and out of an interior of the front-end of the vehicle 102. Specifically, ambient airflow from outside of (e.g., exterior to) the vehicle 102 may enter an under hood area 110, inside the vehicle 102, via the plurality of vents 106. The ambient airflow from outside the vehicle 102 may flow to under hood components, including an engine 100, a control system (e.g., engine or vehicle electronic control system) 28, and a radiator 80 (and/or additional heat exchangers). As a result, the airflow 108 flowing into the under hood area 110 may increase cooling of the engine 100 and additional engine components (including heat exchangers and electronics of the control system 28).

As shown FIG. 1A, a rain tray 116 (which may also be referred to as a rain guard) may be coupled to the vehicle 102, vertically below the vents 106 of the vented hood, with respect to a vertical direction 118, the vertical direction 118 relative to a ground (e.g., surface) 120 on which the vehicle sits. In one example, a portion (e.g., end) of the rain tray may be directly coupled to an underside (e.g., interior surface) of the vented hood 104. Thus, as shown in FIG. 1A, the rain tray 116 may have a first end that is coupled directly to the vented hood 104 and a second end, arranged opposite the first end, that is not coupled to the vented hood 104 and thus may be an open end. The rain tray 116 may span across a portion of the under hood area 110, in a direction perpendicular to the vertical direction 118. In another embodiment, the rain tray 116 may not be coupled directly to the vented hood 104, but mounted to an alternate component in the under hood area 110, and mounted below the vents 106.

As shown in FIGS. 1A-1B, the under hood area 110 of the vehicle 102 may include a switch (e.g., electronic switch) 124 mounted to a surface of a ledge, or support 126. The support 125 may be coupled to a body of the vehicle 102 and/or a component of the engine 100. In another embodiment, the switch 124 may be located on the rain tray 116, the body of the vehicle, the hood 104, or a combination of two or more of these locations. The support 126 may be positioned vertically below the vents 106 and vertically above the engine 100. In one example, the support 126 may be adapted to support and/or couple with the rain tray 116, as shown in FIG. 1A. The support 126 may extend along a portion of a length of the rain tray 116 when the rain tray 116 is coupled to the vehicle 102. The switch 124 may be in electronic communication with a controller 12 of the control system 28, as described further below. For example, when the rain tray 116 is coupled to the vehicle 102, the rain tray 116 may contact and trip the switch 124, thereby resulting in an electronic signal being sent to the controller 12. For example, the switch may be configured as an open or closed signal which is received by the controller. In response to receiving this electronic signal, the controller may determine that the rain tray is coupled to the vehicle 102, beneath the vents 106 of the vented hood 104. When the rain tray 116 is removed from the vehicle 102, a second electronic signal (or absence of the first electronic signal) may be sent to the controller 12, via the switch 124, indicating that the rain tray 116 is no longer contacting the switch 124 and no longer coupled inside the vehicle 102, below the vented hood 104.

The rain tray 116 may be shaped to catch and divert rain entering the under hood area 110 via the vents 106 away from the engine 100. Thus, the rain tray 116 may prevent (or reduce the amount of) rain, or water, from contacting the engine 100 and control system 28, thereby reducing degradation to the engine 100 and electronics of the control system 28. However, as shown in FIG. 1A, when the rain tray is mounted inside the under hood area 110, below the vents 106, the area for vented airflow may be reduced. For example, at the open end of the rain tray 116, there is a first area 122 for vented and/or ambient airflow to pass between the under hood area 110 and exterior of the vehicle 102, via the vents 106. This first area 122 may not allow sufficient cooling airflow to the engine 100, control system 28, radiator 80, and/or additional engine components when the vehicle 102 is traveling at a vehicle speed over a threshold speed. Additionally, when the vehicle is traveling at the vehicle sped over the threshold speed, an increased load, from incoming ambient airflow 108, may be applied to the rain tray 118. As a result, degradation of the rain tray may occur.

Thus, an operator of the vehicle 102 may decide to remove the rain tray 118, as shown in FIG. 1B. Specifically, FIG. 1B shows the vehicle 102 with the rain tray 118 removed and uncoupled from the vented hood 104. As shown in FIG. 1B, removing the rain tray 118 increases the area for vented and/or ambient airflow to pass between the under hood area 110 and exterior of the vehicle 102, via the vents 106. For example, in addition to first area 122 shown in FIG. 1A, removing the rain tray 116 adds larger, second area 130, and third area 132 for airflow. As a result, more cooling airflow can reach the engine 100, radiator 80, and control system 28. Thus, the vehicle 102 may travel at a higher speed with the rain tray 116 removed than when the rain tray 116 is coupled to the vehicle 102 (as shown in FIG. 1A) while still allowing sufficient cooling airflow to the engine 100 and additional vehicle components. In one example, the rain tray 116 may block up to 90% of the vent holes of the vents 106 and/or the vented airflow area between the under hood area 110 and exterior of the vehicle 102.

FIGS. 1A-1B further show the control system (e.g., vehicle and/or engine electronic control system) 28. Control system 28 may be communicatively coupled to various components of vehicle 102 and engine 100 to carry out the control routines and actions described herein. For example, as shown in FIGS. 1A-1B, control system 28 may include an electronic digital controller 12. Controller 12 may be a microcomputer, including a microprocessor unit, input/output ports, an electronic storage medium (e.g., memory) for executable programs and calibration values, random access memory, keep alive memory, and a data bus. As depicted, controller 12 may receive input from a plurality of sensors 30, which may include user inputs and/or sensors (such as windshield wiper speed, presence or amount of rain input via rain sensor 128, presence of rain tray via switch 124, transmission gear position, gas or accelerator pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as coolant temperature, fan speed, passenger compartment temperature, ambient humidity, etc.), and others. In addition, controller 12 may receive data from a GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route. In one embodiment, where the in-vehicle communications and entertainment system includes a GPS, current and future weather data may be correlated with current and future travel routes displayed on the GPS. In an alternate embodiment, wherein the vehicle system includes a dedicated GPS 34, each of the GPS and the in-vehicle communications and entertainment system may communicate with the wireless communication device 40, as well as with each other, to communicate current and future weather data with current and future travel routes. In one example, the entertainment system may access various weather maps stored on the internet or other cloud computing systems. The stored weather maps may include rain, humidity, precipitation and/or temperature information provided as contour maps, for example. In one example, the wireless communication device 40 may relay real-time precipitation (e.g., rain) data to the in-vehicle communications and entertainment system 26, and/or GPS 34, which is then relayed to the controller 12. The controller 12 compares the received precipitation data to threshold values and determines the appropriate vehicle operating parameter adjustments or alerts to send to the vehicle operator. In one example, these alerts may include notifying a vehicle operator that it is raining and the rain tray needs to be coupled to the vehicle if it is not currently installed.

In other embodiments, the presence of rain may be inferred from other signals or sensors, such as rain sensor 128. In one example, the rain sensor 128 may include rain sensing windshield wipers and rain may be inferred from a windshield wiper on/off signal or a speed of the windshield wipers (e.g., for variable windshield wipers that automatically adjust the windshield wiper speed responsive to an amount of rain). Specifically, in one example, when the windshield wipers are on or moving above a threshold speed, a signal may be sent to controller 12 to indicate rain.

In another example, the rain sensor 128 may be a sensor mounted directly to the windshield 112 that is adapted to sense rain falling on or near the windshield 112 (e.g., such as a rain sensing camera). The controller may use this information to determine whether a rain tray should be coupled to the vehicle 102, below the vents 106 and/or determine an upper vehicle speed threshold (e.g., limit) when the rain tray is installed in the vehicle 102.

Furthermore, controller 12 may communicate with various actuators 32, which may include engine actuators (such as fuel injectors, an electronically controlled intake air throttle plate, spark plugs, braking system, brake pedal, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

In this way, the controller 12 receives signals from the various sensors of FIGS. 1A-1B and employs the various actuators of FIGS. 1A-1B to adjust engine operation based on the received signals and instructions stored on a memory of the controller 12. For example, the controller may determine that the rain tray should be installed and/or determine a vehicle speed threshold below which the vehicle should be maintained while the rain tray is installed responsive to signals received from one or more of the switch 123, rain sensor 128, GPS 34, and/or in-vehicle communications and entertainment system 26. The controller 12 may then notify a vehicle operator that a rain tray should be installed or the vehicle speed is being maintained (e.g., limited) below a set vehicle speed threshold due to the rain tray being installed and/or the presence of rain via sending a signal to a display panel 134 of the vehicle 102. For example, the display panel 134 may display a visual alert, via a symbol or text, to the vehicle operator in response to signals sent from the controller 12. In another example, adjusting vehicle speed based on a set upper vehicle speed threshold may include adjusting an actuator of a vehicle speed controller, a throttle, a brake pedal, and/or accelerator pedal, of the vehicle 102.

Figure 2:
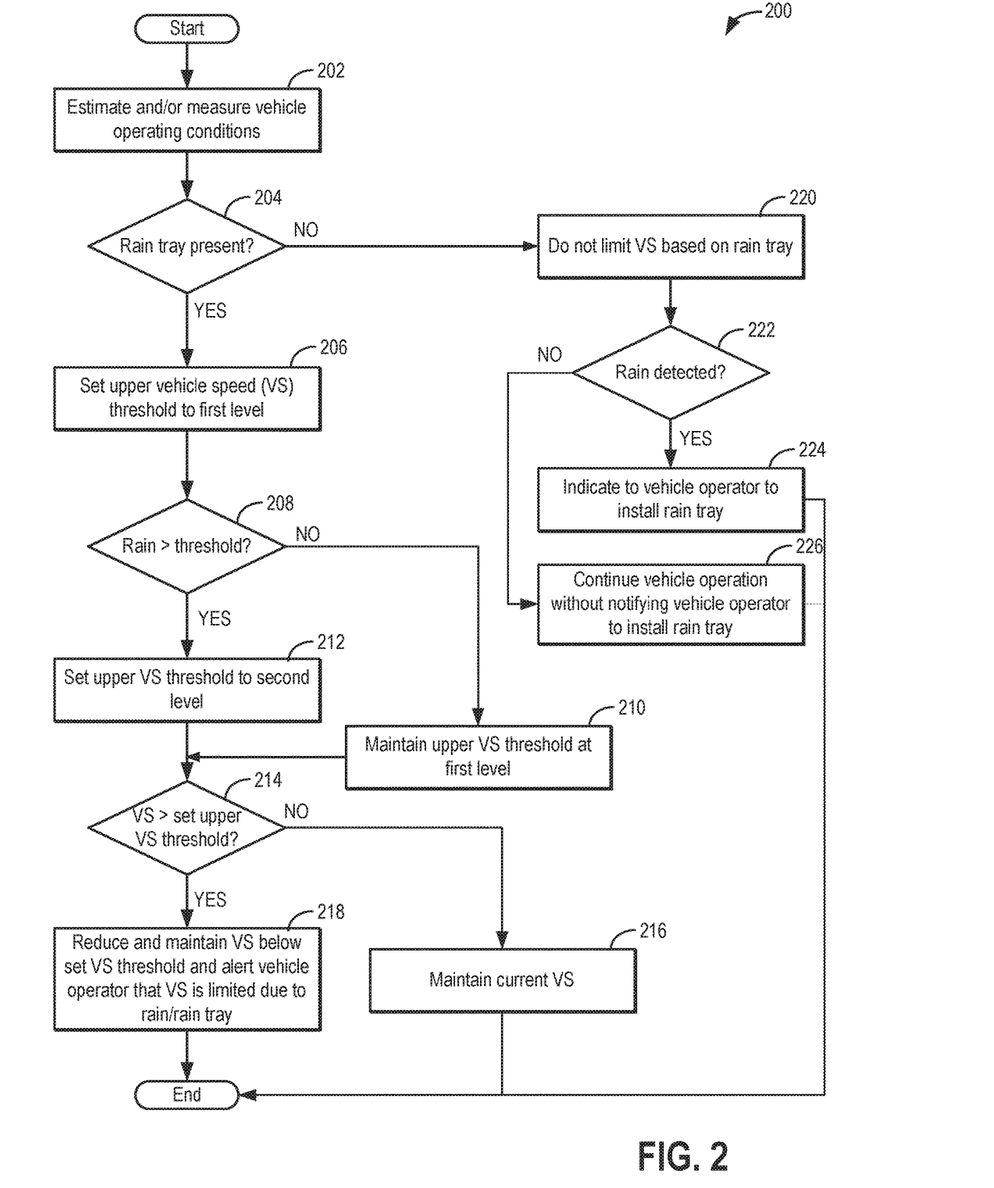
FIG. 2 shows a flow chart of a method for controlling vehicle speed based on a presence of a rain tray coupled below a vented hood of a vehicle.
Figure 3:
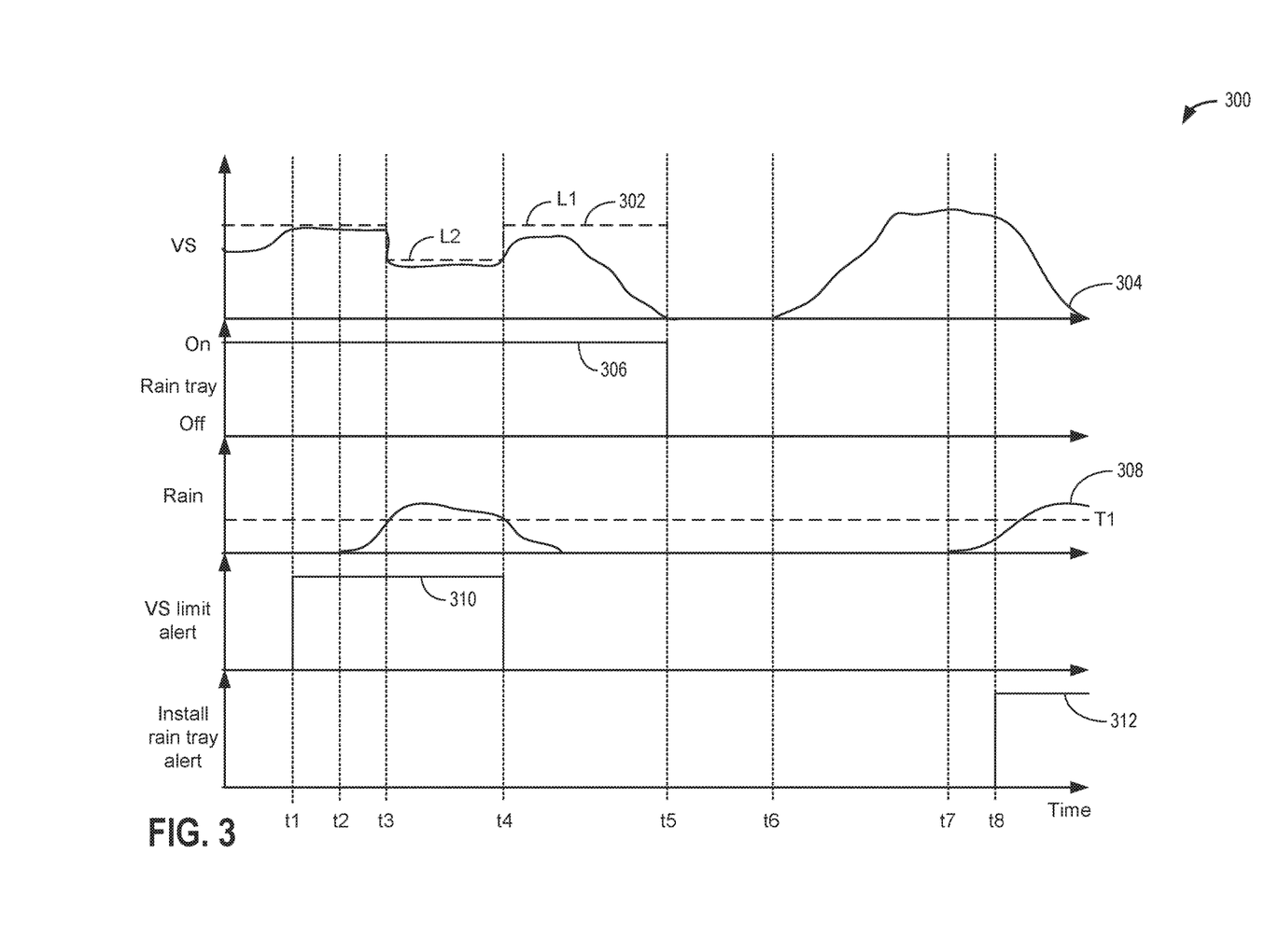
FIG. 3 shows an example graph of operating a vehicle based on the presence of a rain tray of a vented hood of the vehicle.

Turning to FIG. 2, a flow chart of a method 200 for controlling vehicle speed based on a presence of a rain tray coupled below (or proximate to) a vented hood of a vehicle is shown. As explained above, a vehicle (such as the vehicle 102 shown in FIGS. 1A-1B) may include a vented hood (e.g., vented hood 104 shown in FIGS. 1A-1B) including a plurality of vents allowing air to flow between an exterior of the vehicle and an under hood area where an engine of the vehicle is installed. A removable rain tray (e.g., rain tray 116 shown in FIG. 1A) may be coupled to the vehicle, below the vents of the vented hood in order to catch rain entering the under hood area via the vents and reduce the likelihood of rain contacting and entering the engine. Instructions for carrying out method 200 may be executed by a controller (e.g., controller 12 shown in FIGS. 1A-1B) based on instructions stored on a memory of the controller and in conjunction with signals received from sensors of the engine system (such as switch 124 and rain sensor 128 shown in FIGS. 1A-1B), such as the sensors described above with reference to FIGS. 1A-1B. The controller may employ engine actuators of the engine system to adjust engine operation, according to the methods described below.

Method 200 begins at 202 by estimating and/or measuring vehicle operating conditions. Vehicle operating conditions may include engine speed and/or load, vehicle speed, the presence of or amount of rain at the vehicle (e.g., via a signal received from rain sensor 128 shown in FIGS. 1A-1B), the presence of a rain tray (e.g., via a signal received from switch 124 shown in FIGS. 1A-1B), engine coolant temperature, intake air temperature, mass air flow, driver/vehicle operator torque demand (e.g., via a signal from an accelerator pedal), etc. At 202, the method includes determining whether a rain tray for the vented hood is present (e.g., installed) in the vehicle. As explained above, a rain tray may be mounted below vents of the vented hood. When installed and mounted within the vehicle, below the hood vents, the rain tray may contact and/or trigger a sensor, such as a switch arranged proximate to a mounting location of the rain tray (e.g., such as switch 124 shown in FIGS. 1A-1B). As one example, the rain tray may depress a portion of the switch upon coupling the rain tray underneath the hood, below the hood vents. Upon depression or activation of the switch, an electrical signal may be sent from the switch to the controller indicating that the rain tray is coupled inside the vehicle. In other embodiments, the sensor for detecting installation of the rain tray within the vehicle may be an alternate type of sensor, such as an electronic sensor that senses a proximity of the rain tray to the sensor. The controller may receive an electrical signal from the sensor or switch arranged proximate to the mounting location of the rain train once the rain tray has been coupled within the vehicle, below the hood vents (or to the vented hood). In this way, a controller may determine whether the rain tray is present within the vehicle (e.g., whether it is coupled or uncoupled from its mounting location underneath the hood, below the vents of the vented hood) based on a signal received (or not received) from the rain tray sensor or switch. If the controller receives the signal indicating the rain tray is installed and coupled below the hood vents, the method continues to 206.

At 206, the method includes setting an upper vehicle speed threshold (e.g., limit) to a first level (e.g., first vehicle speed or first vehicle speed level). As one example, the upper vehicle speed threshold may be a vehicle speed at or above which the engine of the vehicle may not receive sufficient cooling and thus may overheat or result in reduced engine control. For example, when the vehicle is traveling at or above the first vehicle speed level (the upper vehicle speed threshold), a certain amount of engine cooling may be required for efficient engine operation. However, when the rain tray is installed, cooling airflow to the engine may be reduced, and thus less cooling may be provided to the engine. Then, if the vehicle is traveling at or above the first vehicle speed level when the rain tray is installed, the engine may not receive the required amount of engine cooling. The upper vehicle speed threshold may additionally or alternatively be a vehicle speed above which degradation to the rain tray may occur (due to increased velocity of the incoming airflow via the vents of the vented hood). As one example, setting the upper vehicle speed threshold to the first level may include setting, within memory of the controller, the upper vehicle speed threshold to the first level. In another example, the controller may include a vehicle speed controller and thus setting the threshold to 206 may include setting the upper vehicle speed threshold to the first level within the vehicle speed controller. When vehicle speed is being adjusted, based on an operator torque demand (e.g., via input from an accelerator pedal), the controller may look up and use the stored and set upper vehicle speed threshold, as described further below.

At 208, the method includes determining whether precipitation, or rain, is occurring above a threshold level or amount. As one example, the threshold amount may be zero and thus the method at 208 may include determining whether rain is occurring at the vehicle (e.g., whether it is raining in the environment which the vehicle is traveling and/or whether rain is falling on the vehicle). In another example, the threshold amount may be a non-zero amount (and greater than zero). The non-zero threshold amount may be an amount of rain that may enter the vehicle via the vents of the vented hood and result in degradation of the engine or engine system components. As one example, an indication of rain may be generated at the controller in response to an output of a rain sensor which may include one or more of rain sensing windshield wipers, a windshield mounted rain sensor (e.g., such as a sensor including camera), and/or a water level sensor positioned within the rain tray. As another example, the amount of rain occurring at the vehicle may be determined based on one or more of a speed of rain sensing windshield wipers, an output of a windshield mounted rain sensor, and a level of water detected via a sensor positioned within the rain tray. As yet another example, the presence of rain and/or the amount of rain occurring at the vehicle may be determined based on feedback (such as weather reports and vehicle location) from a GPS and/or in-vehicle communications and entertainment system of the vehicle (e.g., such as GPS 34 and in-vehicle communications and entertainment system 26 shown in FIGS. 1A-1B). The method at 208 may include the controller comparing the determined amount of rain to the threshold amount of rain. If it is not raining or the amount of rain is not greater than the threshold amount, the method continues to 210 to maintain the upper vehicle speed threshold at the first level (e.g., as set at 206). Alternatively, if it is raining and/or the amount of rain is greater than the threshold amount, the method continues to 212 to set the upper vehicle speed threshold to the second level (e.g., second vehicle speed or second vehicle speed level). The second level may be lower than the first level. For example, the method at 212 may include decreasing the upper vehicle speed threshold set at the controller from the first level to the second level in response to rain or rain over the threshold level. In one example, the second level may be a set vehicle speed at all rain conditions. In another example, the second level may decrease as the determined amount of rain increases. In this way, the method at 212 may include the controller determining the second vehicle speed level (and thus the setting of the upper vehicle speed threshold) based on the determined amount of rain. For example, the controller may make a logical determination regarding the second vehicle speed level based on logic rules that are a function of the amount of rain occurring at the vehicle.

In an alternate embodiment, the upper vehicle speed threshold may be set to the first level responsive to the presence of the rain tray, regardless of whether it is raining. In this example, method 200 may proceed directly from 206 to 214 (omitting the methods at 208, 212, and 210).

The method continues to 214 from both 212 and 210. At 214, the method includes determining if vehicle speed (e.g., the current vehicle speed and/or the operator demanded vehicle speed level) is greater than the set upper vehicle speed threshold. As explained above, the set upper vehicle speed threshold may be set to either the first level (if the rain train is present but it's not raining over the threshold amount) or the second level (if the rain train is present and it is raining over the threshold amount). If the current vehicle speed or operator demanded vehicle speed is not greater than the set upper vehicle speed threshold, the method continues to 216 to maintain the current vehicle speed (which may be the operator demanded vehicle speed). However, if the current vehicle speed or operator demanded vehicle speed is greater than the set upper vehicle speed threshold, the method continues to 218. At 218, the method includes reducing and/or maintaining the vehicle speed of the vehicle below the set upper vehicle speed threshold. In one example, this may include maintaining the vehicle speed below an operator demanded vehicle speed level when the operator demanded vehicle speed level is higher than the set upper vehicle speed threshold. Said another way, the controller may maintain (or adjust) the vehicle speed below the set upper vehicle speed threshold, even when the operator demanded vehicle speed is greater than the set upper vehicle speed threshold. In another example, the method at 218 may include decreasing the vehicle speed below the set upper vehicle speed threshold if the vehicle is traveling at a speed at or higher than the upper vehicle speed threshold. In yet another example, the method at 218 may include the controller actuating one or more vehicle actuators, such as a throttle plate of a throttle (to adjust a throttle opening), fuel injectors, and/or vehicle brakes or a braking system, to maintain the vehicle speed below the set upper vehicle speed threshold. For example, the controller may make a logical determination (e.g., regarding a position of the throttle plate, a pulse width signal of the fuel injectors, and a position of the brake pedal) based on logic rules that are a function of the current vehicle speed or the demanded vehicle speed and the set upper vehicle speed threshold. The controller may then generate a control signal that is sent to the throttle, fuel injectors, and/or braking system. In this way, the method at 218 may include limiting the speed of the vehicle to a level that is below the set upper vehicle speed threshold. The method at 218 may further include alerting the vehicle operator that the vehicle speed is being limited to a level below the upper vehicle speed threshold due to rain and/or the presence of the rain tray. For example, the controller may send a signal to an instrument control or display panel in a passenger compartment of the vehicle (e.g., such as display panel 134) so that a visual (or audible) signal is presented to the user (e.g., via a symbol or text) and indicates that vehicle speed is being maintained below a threshold level due to the rain tray being installed. As one example, the indication may inform the vehicle operator to remove the rain tray if it's not raining and if the vehicle operator wants to travel at a higher vehicle speed (e.g., higher than the set upper vehicle speed threshold).

Returning to 204, if the controller does not receive the signal indicating that the rain tray is installed and coupled below the hood vents, or the controller receives a different signal indicting the rain tray has been removed from the vehicle, the method continues to 220. At 220, the method includes not limiting vehicle speed based on the presence of the rain tray. Thus, the method at 220 may include adjusting the vehicle speed to an operator demanded level (e.g., based on a signal received from an accelerator pedal operated by the driver). At 222, the method includes determining whether rain is detected via one or more of the rain sensors discussed above with reference to the method at 208. If rain is detected at the vehicle, the method continues to 224 to indicate to (e.g., notify) the vehicle operator to install the rain tray. For example, if it is raining and the rain tray is not installed below the vents of the vented hood, the controller may send a signal to a display panel to indicate that the vehicle should be stopped and the rain tray should be installed. Alternatively, if rain is not detected at the vehicle, the method continues from 222 to 226 to continue vehicle operation without notifying the vehicle operator to install the rain tray.

FIG. 3 shows an example graph 300 of operating a vehicle based on the presence of a rain tray of a vented hood of the vehicle. Specifically, graph 300 shows changes in an upper vehicle speed threshold at plot 302, changes in vehicle speed of the vehicle at plot 304, changes in the presence (installation) of a rain tray, below vents of the vented hood at plot 306, changes in rainfall at the vehicle at plot 308, changes in a vehicle speed limit alert (e.g., notification) at plot 310, and changes in a install rain tray alert (e.g., notification) at plot 312. As explained above the rain tray may be coupled to the vehicle, underneath the vented hood and below vents of the vented hood. As shown in FIGS. 1A-1B, a controller of the vehicle may determine the rain tray is coupled to the vehicle, below the hood vents, in response to a signal received from a sensor or switch positioned proximate to a mounting location of the rain tray (e.g., switch 124 shown in FIGS. 1A-1B). Further, the upper vehicle speed threshold may be set by and within memory of the controller and may be adjusted based on the presence of the rain tray and/or rain conditions.

Prior to time t1, the rain tray is installed in the vehicle (e.g., coupled to and/or underneath vents of the vented hood) (plot 306) and no rain is detected at the vehicle (plot 308). Thus, the upper vehicle speed threshold is set to a first level, L1. Prior to time t1, the operator demanded vehicle speed may be lower than the upper vehicle speed threshold. As a result, no alert of vehicle speed limiting may be presented to the vehicle operator (plot 310). However, in alternate embodiments, a notification to the user of the set upper vehicle speed threshold due to the rain tray may be generated, even when the vehicle speed is not being limited (e.g., when demanded vehicle speed is lower than the set upper vehicle speed limit). At time t1, the operator demanded vehicle speed may increase over the upper vehicle speed threshold. Thus, the vehicle speed is increased to a level just below the upper vehicle speed threshold (plots 302 and 304). In response to the vehicle speed being maintained (e.g., limited) below the upper vehicle speed threshold, the controller may generate and display an alert to the vehicle operator indicating that the vehicle speed is being limited to the upper vehicle speed threshold due to the rain tray being installed (plot 310). At time t2, it begins to rain (as determined based on outputs of a rain sensor and/or received data from the vehicle GPS and/or communications and entertainment system). At time t3, the amount of rain increases above a threshold amount of rain T1. In response to the rain increasing above the threshold amount T1, the set upper vehicle speed threshold is reduced to a second level, L2 (plot 302). In response to the upper vehicle speed threshold being reduced, the vehicle speed is also reduced below the new upper vehicle speed threshold. Additionally, the vehicle speed limit alert may further include a notification to the vehicle operator that the vehicle speed is being further limited due to rain. In the example shown in FIG. 3, the threshold amount of rain, T1, for reducing the set upper vehicle speed threshold is greater than zero. However, in alternate embodiments, any amount of rain, or detection of rain for greater than threshold amount of time (e.g., 30 seconds) may result in setting the upper vehicle speed threshold to the second level L2.

At time t4, the amount of rain occurring at the vehicle decreases below the threshold amount of rain T1. As a result, the controller increases the set upper vehicle speed threshold to the first level L1 (plot 302). In response to this increase in the upper vehicle speed threshold, the controller increases the vehicle speed to the operator demanded vehicle speed which is above the second level L2 but lower than the first level L1 (plot 304). As a result of the vehicle speed no longer being limited below the operator demanded vehicle speed, the controller may remove the vehicle speed limit alert displayed to the vehicle operator. Between time t4 and time t5, the rain stops but the rain tray remains coupled to the vehicle.

At time t5, the vehicle operator stops the vehicle (e.g., vehicle speed goes to zero at plot 304) and removes the rain tray (plot 306). The vehicle operator then restarts the vehicle and the vehicle speed begins increasing again at time t6. Since the rain tray is not present and installed in the vehicle after time t6, the vehicle speed is not limited based on the rain tray. Instead, the controller may adjust the vehicle speed (e.g., via adjusting the throttle) to the operator demanded level, which may be greater than the first level L1 and second level L2. At time t7, it begins to rain. In response to detection of rain at the vehicle, an alert to install the rain tray is generated and displayed to the vehicle operator. In one example, the alert to install the rain tray may be generated in response to detection of any amount of rain (e.g., any amount greater than zero). In another example, as shown in FIG. 3, the alert to install the rain tray may be generated in response to detecting an amount of rain over a threshold level, but the threshold level may be smaller than the threshold amount of rain T1. In yet another example, the alert to install the rain tray may be generated in response to detecting an amount of rain over the threshold amount of rain T1. In response to seeing the alert, the vehicle operator may slowly stop the vehicle in order to reinstall the rain tray below the vents of the vented hood, in the under hood area.

In this way, a vehicle may be controlled based on the presence of a rain tray, coupled within an under hood area, below vents of a vented hood. Specifically, when the rain tray is mounted within the vehicle, below the hood vents, a speed of the vehicle may be maintained below a first threshold level. In some embodiments, when rain is present at the vehicle while the rain tray is installed, the speed of the vehicle may be further limited and maintained below a second threshold level that is lower than the first threshold level. An operator of the vehicle may be notified (e.g., alerted) via an audible or visual signal that the vehicle speed is being limited (e.g., below an operator demanded vehicle speed) due to the rain tray being installed. In some examples, the vehicle operator may decide to manually remove (uncouple) the rain tray from the vehicle and continue driving without the rain tray installed. This may allow the operator to travel at a higher vehicle speed than when the rain tray is installed. However, if it begins raining while the rain tray is not installed within the vehicle, the controller may generate and display a notification to the vehicle operator to reinstall the rain tray (in order to reduce the likelihood of degradation to the engine and additional engine system components). The technical effect of maintaining a vehicle speed of the vehicle below a set vehicle speed threshold and alerting a vehicle operator of the set vehicle speed threshold, in response to a signal indicating that a rain tray is coupled below a vent of a vented hood of a vehicle, is reducing degradation to the rain tray (due to increased vehicle speeds) and providing enough cooling airflow for the cooling demands of the engine (e.g., at higher vehicle speeds, engine cooling demands may increase but the rain tray may reduce the amount of air able to reach the engine for cooling). Further, by further limiting vehicle speed when it is raining while the rain tray is coupled inside the vehicle, engine degradation due to water entering the vehicle via the hood vents may be reduced. Engine degradation from water may be further reduced by alerting the vehicle operator to install the rain tray (if not already installed) in response to rain at the vehicle. In this way, degradation to the engine and rain tray may be reduced while supplying adequate cooling to the engine.

As one embodiment, a method for a vehicle includes in response to a signal indicating that a rain tray is coupled within a vehicle, below a vent of a vented hood of the vehicle, maintaining a vehicle speed of the vehicle below a set vehicle speed threshold and alerting a vehicle operator of the set vehicle speed threshold. In a first example of the method, the method further comprises setting the set vehicle speed threshold to a first level in response to the signal indicating that the rain tray is coupled within the vehicle. A second example of the method optionally includes the first example and further includes setting the set vehicle speed threshold to a second level, lower than the first level, in response to an indication of rain while the rain tray is coupled within the vehicle. A third example of the method optionally includes one or more of the first and second examples, and further includes, wherein the indication of rain is generated in response to one or more of a signal from rain sensing windshield wipers, a signal from a windshield mounted rain sensor, and a water sensor positioned within the rain tray. A fourth example of the method optionally includes one or more of the first through third examples, and further includes setting the set vehicle speed threshold to a second level, lower than the first level, in response to an indication of an amount of rain over a threshold amount, wherein the amount of rain is determined based on one or more of a speed of rain sensing windshield wipers, an output of a windshield mounted rain sensor, and a level of water detected via a sensor positioned within the rain tray. A fifth example of the method optionally includes one or more of the first through fourth examples, and further includes, wherein the second level decreases as the determined amount of rain increases. A sixth example of the method optionally includes one or more of the first through fifth examples, and further includes, wherein maintaining the vehicle speed below the set vehicle speed threshold includes maintaining the vehicle speed below an operator demanded vehicle speed level when the operator demanded vehicle speed level is higher than the set vehicle speed threshold. A seventh example of the method optionally includes one or more of the first through sixth examples, and further includes, wherein the signal indicating that the rain tray is coupled within the vehicle is generated in response to a switch coupled within the vehicle, proximate to a mounting location of the rain tray, being activated by the rain tray. An eighth example of the method optionally includes one or more of the first through seventh examples, and further includes, in response to the rain tray not being coupled within the vehicle, adjusting the vehicle speed to an operator-demanded level and not limiting the vehicle speed based on the rain tray. A ninth example of the method optionally includes one or more of the first through eighth examples, and further includes, in response to detecting rain while the rain tray is not coupled within the vehicle, indicating to a vehicle operator to install the rain tray underneath the vented hood.

As another embodiment, a method for a vehicle includes setting a vehicle speed threshold to a first level in response to a rain tray being coupled below a vent of a vented hood of a vehicle; setting the vehicle speed threshold to a second level, lower than the first level, in response to detecting rain at the vehicle while the rain tray is coupled below the vent; and maintaining a vehicle speed of the vehicle below the set vehicle speed threshold. In a first example of the method, setting the vehicle speed to the first level is further responsive to the indication of rain being less than the threshold level while the rain tray is coupled below the vent. A second example of the method optionally includes the first example and further includes, wherein detecting rain at the vehicle includes detecting an amount of rain over a threshold level based on outputs from one or more of rain sensing windshield wipers of the vehicle, a windshield mounted rain sensor, and a water level sensor of the rain tray. A third example of the method optionally includes one or more of the first and second examples, and further includes, wherein detecting rain at the vehicle includes predicting rain based on outputs of a global positioning system of the vehicle and one or more of real-time and forecasted weather conditions received at a communications and entertainment system of the vehicle from a wireless communication device of the vehicle. A fourth example of the method optionally includes one or more of the first through third examples, and further includes adjusting the vehicle speed to an operator-demanded level, even if the operator-demanded level is greater than the first level, in response to the rain tray not being coupled to the vent of the vented hood. A fifth example of the method optionally includes one or more of the first through fourth examples, and further includes, in response to detecting rain at the vehicle while the rain tray is not coupled below the vent of the vented hood, indicating a request to an operator of the vehicle to couple the rain tray within the vehicle, below the vent of the vented hood. A sixth example of the method optionally includes one or more of the first through fifth examples, and further includes notifying an operator of the vehicle that the vehicle speed is being maintained below the set vehicle speed threshold and to remove the rain tray if it is not raining and if vehicle speed above the set vehicle speed threshold is desired.

As yet another embodiment, a system for a vehicle includes: a vented hood including at least one vent; a switch coupled to a support positioned in an under hood area of the vehicle, the switch adapted to produce an electrical signal indicating a rain tray is present when the rain tray is coupled within the under hood area, below the at least one vent; an engine positioned within the vehicle and underneath the vented hood; and an engine controller including instructions stored in memory for: setting a vehicle speed limit of the vehicle to a first level in response to receiving the electrical signal indicating the rain tray is present; setting the vehicle speed limit to a second level, lower than the first level, in response to each of rain occurring at the vehicle and receiving the electrical signal indicating the rain tray is present; and maintaining a vehicle speed of the vehicle below the set vehicle speed limit. In a first example of the system, the instructions further include instructions for indicating that rain is occurring at the vehicle based on outputs from one or more of rain sensing windshield wipers, a rain sensor mounted to a windshield of the vehicle, a fluid level sensor mounted on the rain tray, and a communications and entertainment system of the vehicle that is in communication with a wireless communication device of the vehicle that receives real-time and forecasted weather conditions. A second example of the system optionally includes the first example and further includes a display panel and wherein the instructions further include instructions for notifying a vehicle operator of the set vehicle speed limit and that the vehicle speed is being maintained below the set vehicle speed limit via the display panel.

In another representation, a method for a vehicle includes limiting vehicle speed of the vehicle to a set vehicle speed limit in response to a rain tray being installed within the vehicle, beneath vents of a vented hood of the vehicle and reducing the set vehicle speed limit in response to rain being detected at the vehicle.

In yet another representation, a method for a vehicle includes: during a first mode, when a rain tray is installed in an under hood area of the vehicle, below vents of a vented hood of the vehicle, limiting a vehicle speed of the vehicle to a level below a set threshold speed level; and, during a second mode, when the rain tray is not installed in the vehicle, not limiting vehicle speed to the level below the set threshold level and adjusting the vehicle speed to an operator demanded speed level.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
in response to an electrical signal indicating that a rain tray is coupled within a vehicle, below a vent of a vented hood of the vehicle, setting a vehicle speed limit of the vehicle to a first threshold;

in response to each of rain occurring at the vehicle and receiving the electrical signal indicating the rain tray is present, setting the vehicle speed limit to a second threshold, lower than the first threshold; and maintaining a vehicle speed of the vehicle below the vehicle speed limit and alerting a vehicle operator of the set vehicle speed limit.

2. The method of claim 1, wherein maintaining vehicle speed below the vehicle speed limit includes actively preventing vehicle speed from rising above the first threshold by adjusting an engine output via a controller.

3. The method of claim 1, wherein the indication of rain is generated in response to one or more of a signal from rain sensing windshield wipers, a signal from a windshield mounted rain sensor, and a water sensor positioned within the rain tray.

4. The method of claim 1, where the second threshold decreases as the determined amount of rain increases.

5. The method of claim 1, wherein maintaining the vehicle speed below the vehicle speed limit includes maintaining the vehicle speed below an operator demanded vehicle speed level when the operator demanded vehicle speed level is higher than the set vehicle speed threshold.

6. The method of claim 1, wherein the signal indicating that the rain tray is coupled within the vehicle is generated in response to a switch coupled within the vehicle, proximate to a mounting location of the rain tray, being activated by the rain tray.

7. The method of claim 1, further comprising, in response to the rain tray not being coupled within the vehicle, adjusting the vehicle speed to an operator-demanded level and not limiting the vehicle speed based on the rain tray.

8. The method of claim 7, in response to detecting rain while the rain tray is not coupled within the vehicle, indicating to a vehicle operator to install the rain tray underneath the vented hood.

9. A method, comprising:

setting a vehicle speed limit of a vehicle to a first threshold in response to an electrical signal indicating that a rain tray being coupled below a vent of a vented hood of a vehicle;

setting the vehicle speed limit of the vehicle to a second threshold, the second threshold lower than the first threshold, in response to detecting rain at the vehicle while receiving an electrical signal indicating the rain tray is coupled below the vent; and maintaining a vehicle speed of the vehicle below the set vehicle speed limit.

10. The method of claim 9, wherein setting the vehicle speed limit to the first threshold is further responsive to the indication of rain being less than a third threshold level while the rain tray is coupled below the vent.

11. The method of claim 9, wherein detecting rain at the vehicle includes detecting an amount of rain over a third threshold level based on outputs from one or more of rain sensing windshield wipers of the vehicle, a windshield mounted rain sensor, and a water level sensor of the rain tray.

12. The method of claim 9, wherein detecting rain at the vehicle includes predicting rain based on outputs of a global positioning system of the vehicle and one or more of real-time and forecasted weather conditions received at a communications and entertainment system of the vehicle from a wireless communication device of the vehicle.

13. The method of claim 9, further comprising adjusting the vehicle speed to an operator-demanded level, even if the operator-demanded level is greater than the first threshold, in response to the rain tray not being coupled to the vent of the vented hood.

14. The method of claim 9, further comprising, in response to detecting rain at the vehicle while the rain tray is not coupled below the vent of the vented hood, indicating a request to an operator of the vehicle to couple the rain tray within the vehicle, below the vent of the vented hood.

15. The method of claim 9, further comprising notifying an operator of the vehicle that the vehicle speed is being maintained below the set vehicle speed limit and to remove the rain tray if it is not raining and if vehicle speed above the set vehicle speed limit is desired.

16. A system for a vehicle, comprising:

a vented hood including at least one vent;

a switch coupled to a support positioned in an under hood area of the vehicle, the switch adapted to produce an electrical signal indicating a rain tray is present when the rain tray is coupled within the under hood area, below the at least one vent;

an engine positioned within the vehicle and underneath the vented hood; and an engine controller including instructions stored in memory for:

setting a vehicle speed limit of the vehicle to a first level in response to receiving the electrical signal indicating the rain tray is present;

setting the vehicle speed limit to a second level, lower than the first level, in response to each of rain occurring at the vehicle and receiving the electrical signal indicating the rain tray is present; and maintaining a vehicle speed of the vehicle below the set vehicle speed limit.

17. The system of claim 16, wherein the instructions further include instructions for indicating that rain is occurring at the vehicle based on outputs from one or more of rain sensing windshield wipers, a rain sensor mounted to a windshield of the vehicle, a fluid level sensor mounted on the rain tray, and a communications and entertainment system of the vehicle that is in communication with a wireless communication device of the vehicle that receives real-time and forecasted weather conditions.

18. The system of claim 17, further comprising a display panel and wherein the instructions further include instructions for notifying a vehicle operator of the set vehicle speed limit and that the vehicle speed is being maintained below the set vehicle speed limit via the display panel.

* * * * *